United States Patent
Ueno et al.

(10) Patent No.: US 6,992,863 B2
(45) Date of Patent: Jan. 31, 2006

(54) DISK DRIVE APPARATUS

(75) Inventors: Yoshihiro Ueno, Osaka (JP); Hideki Kuwajima, Kyoto (JP); Makoto Miyamoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 200 days.

(21) Appl. No.: 10/634,995

(22) Filed: Aug. 6, 2003

(65) Prior Publication Data

US 2004/0075948 A1 Apr. 22, 2004

(30) Foreign Application Priority Data

Aug. 6, 2002 (JP) ....................... 2002-228860

(51) Int. Cl.
*G11B 5/54* (2006.01)

(52) U.S. Cl. .................................................. 360/254.7
(58) Field of Classification Search ............. 360/254.7, 360/245.7, 244.5, 244.8
See application file for complete search history.

(56) References Cited

U.S. PATENT DOCUMENTS

| 5,148,339 | A | * | 9/1992 | Yoshida | 360/254.7 |
| 5,936,803 | A | * | 8/1999 | Berding | 360/244.8 |
| 6,751,064 | B2 | * | 6/2004 | Kuwajima et al. | 360/244.8 |
| 2003/0043510 | A1 | * | 3/2003 | Miyamoto et al. | 360/254.7 |
| 2004/0240116 | A1 | * | 12/2004 | Kuwajima et al. | 360/255 |

FOREIGN PATENT DOCUMENTS

| CN | 1256482 A | 6/2000 |
| JP | 09-82052 | 3/1997 |

* cited by examiner

Primary Examiner—A. J. Heinz
Assistant Examiner—Mark Blouin
(74) Attorney, Agent, or Firm—McDermott Will & Emery LLP (57) ABSTRACT

A disk drive apparatus having a head support device with high impact resistance which ensures L/UL operation and CSS operation. The disk drive apparatus includes a supporting arm rotating about a bearing in a direction perpendicular to a recording face of a recording medium; and a ramp provided at any position between the bearing and a head of the supporting arm. The ramp vertically moves the supporting arm while the supporting arm rotates or linearly moves in a radial direction of the magnetic recording medium.

9 Claims, 6 Drawing Sheets

DISK DRIVE APPARATUS

FIELD OF THE INVENTION

The present invention relates to disk drive apparatuses employing a levitation-type head, such as magnetic disk drive apparatuses, optical disk drive apparatuses, and magneto-optical disk drive apparatuses that have a head support mechanism.

BACKGROUND OF THE INVENTION

A sharp expansion of the market for portable electronic equipment (e.g. PDAs and mobile phones) and downsizing of these apparatuses have resulted in demands for greater portability, i.e., smaller, thinner models with higher impact resistance, for disk drive apparatuses which act as data storage means for mobile digital equipment. A range of methods have been proposed to disk drive apparatuses with the aim of achieving improved impact resistance.

One example of a conventional disk drive apparatus employing a Flying-type head or flying head in a magnetic recording and reproducing apparatus, such as a hard disk drive apparatus, is described below with reference to the drawings.

Figure 6:
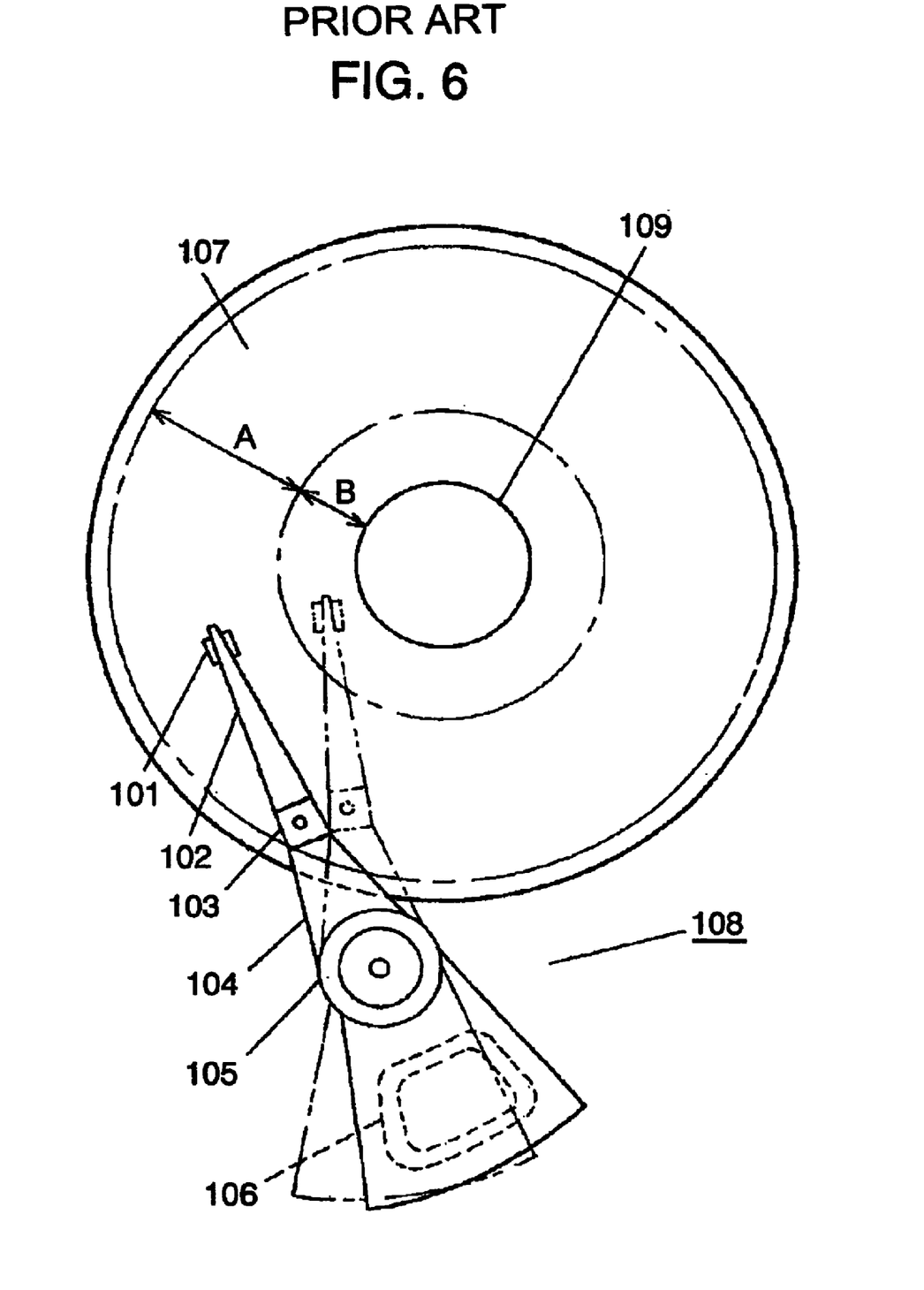
FIG. 6 is a plan view illustrating the configuration of a conventional magnetic recording and reproducing apparatus using CSS system.

FIG. 6 shows the configuration of the conventional magnetic recording and reproducing apparatus. In FIG. 6, head support assembly 108 is configured with suspension 102 with relatively low rigidity, spring portion 103, and supporting arm 104 with relatively high rigidity. Slider 101, on which a magnetic head (not illustrated) is installed, is disposed on the bottom face of one end of suspension 102.

Magnetic recording medium 107 is designed to rotate around spindle motor 109. During recording and playback by the magnetic recording and reproducing apparatus, the magnetic head installed on slider 101 fly from magnetic recording medium 107 to a predetermined distance by the levitation force of airflow generated on slider 101 created by the rotation of magnetic recording medium 107 and the force of head support assembly 108 applied to slider 101 toward magnetic recording medium 107. Voice coil 106 provided on supporting arm 104 rotates head support assembly 108 about bearing 105, during recording and playback, so as to position the magnetic head installed on slider 101 over the required track on magnetic recording medium 107 for recording and playback.

The magnetic recording and reproducing apparatus shown in FIG. 6 is a magnetic recording and reproducing apparatus adopting a system generally called the contact-start-stop system (CSS system). When magnetic recording medium 107 is stationary, the magnetic head is held in contact with magnetic recording medium 107. During recording and playback, however, the magnetic head on slider 101 fly from magnetic recording medium 107. In this CSS system, magnetic recording medium 107 is divided into zone A which is a data zone and zone B to where the magnetic head is moved when rotation stops. To stop the rotation of magnetic recording medium 107, the magnetic head is first moved to zone B while still flying, after which the rotation of magnetic recording medium 107 is slowed down. This reduces airflow between magnetic recording medium 107 and slider 101, resulting in reducing the Positive force or flying force. Finally, the magnetic head contacts magnetic recording medium 107 and stops. However, in some cases, when the magnetic head is stopped, the magnetic head adheres to magnetic recording medium 107. This results in mechanical and magnetic damage to recording medium 107 when restarting. To prevent this adhesion problem, the surface of zone B is made rougher than that of zone A on magnetic recording medium 107 in apparatuses employing the CSS system.

Figure 7:
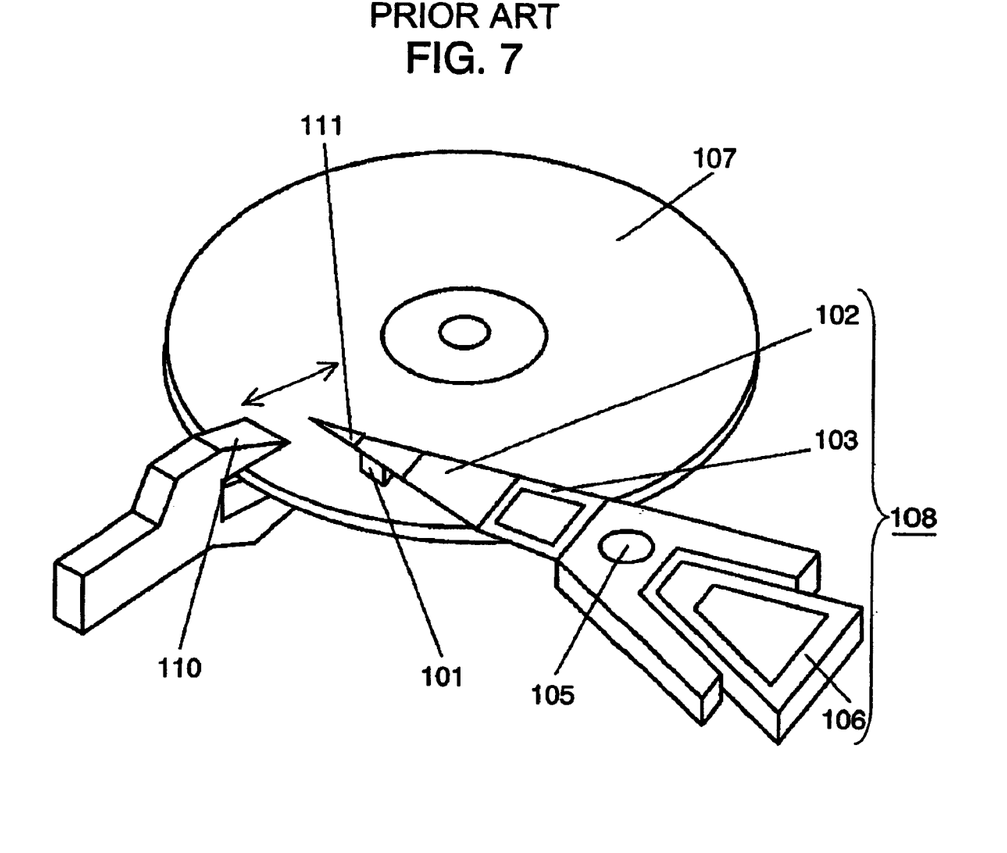
FIG. 7 is a perspective view illustrating the configuration of a conventional magnetic recording and reproducing apparatus using L/UL system.

The load-unload system (L/UL system) is another system for supporting the head. FIG. 7 is a perspective view of the magnetic recording and reproducing apparatus employing the L/UL system. In FIG. 7, head support assembly 108 has a similar configuration to head support assembly 108 in the CSS system shown in FIG. 6. However, head support assembly 108 rotates about bearing 105 while the magnetic recording and reproducing apparatus is stopped so that head support assembly 108 is moved outside of magnetic recording medium 107. Magnetic head holder 110 is provided at the outside of magnetic recording medium 107, and protrusion 111 provided at the tip of suspension 102 is slid up onto a tapered portion of this magnetic head holder 110 so as to hold slider 101 and the magnetic head away from magnetic recording medium 107.

Figure 8:
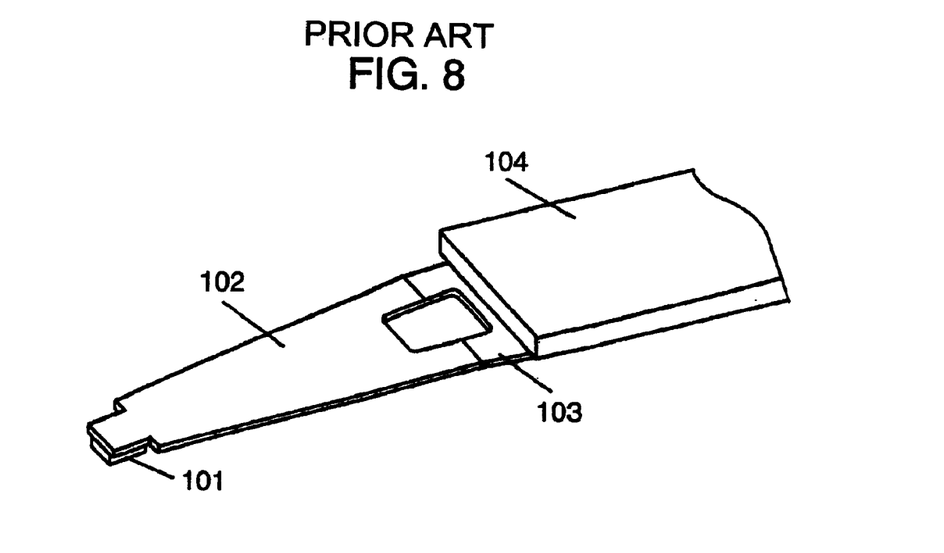
FIG. 8 is a perspective view of a key part where a magnetic head is provided in a conventional head support device.

The configuration of the conventional head support assembly employed in these conventional magnetic recording and reproducing apparatuses and its operation are described next with reference to FIG. 8. FIG. 8 is a perspective view of a key part of the conventional head support assembly. The magnetic head (not illustrated) is installed on slider 101 provided on the bottom face of one end of low-rigidity suspension 102 in a way such that the magnetic head faces the magnetic recording medium (not illustrated). The other end of this suspension 102 is bent to act as spring portion 103. This spring portion 103 is connected to supporting arm 104. In the CSS system, slider 101 contacts the magnetic recording medium when the rotation of the magnetic recording medium is stopped, and the force is applied to slider 101 toward the magnetic recording medium by the reaction force of spring portion 103 against the magnetic recording medium.

The head support assembly of the magnetic recording and reproducing apparatus needs to have a certain degree of flexibility to apply a predetermined load on the slider toward the magnetic recording medium to make the slider trace the up-and-down movements of the surface of the magnetic recording medium. If the suspension is configured with a thin plate to give flexibility to the head support assembly, unstable phenomena such as vibration by bending or torsion occurs in the head support assembly. This is because such suspension has low rigidity and low resonance frequency that become apparent when positioning the head support assembly or moving the head to a standby position.

Accordingly, the following disadvantage is found in adopting the L/UL system with the above suspension structure. L/UL operation becomes unstable due to vibration of the suspension because the guide is provided at the tip of the low-rigidity suspension and this guide is slid up a tapered ramp. To prevent torsion of the suspension, the guide needs to be provided on the axis of symmetry of the suspension. This results in loss of design flexibility. In addition, downsizing of the disk drive apparatus becomes difficult because the L/UL mechanism is provided at the tip of the head supporting arm.

In the CSS system, on the other hand, the pressing force on the slider toward the surface of the magnetic recording medium while the rotation of the magnetic recording medium is stopped is primarily determined by the spring constant of the suspension. Accordingly, the surface roughness of the magnetic recording medium needs to be changed to prevent adhesion of the slider and magnetic recording medium. This is an impediment to the efficient use of the surface of magnetic recording medium, particularly when the size is reduced.

The present invention solves the above disadvantages of the prior art and aims to offer a disk drive apparatus having a head support assembly with high impact resistance that ensures stable L/UL operation or CSS operation.

SUMMARY OF THE INVENTION

A disk drive apparatus of the present invention includes a rotatably supported recording medium, a rotation means for rotating the recording medium, a supporting arm having a head facing the recording medium, a radial driver, and a ramp. The supporting arm is rotatable about a bearing section in a direction perpendicular to the recording face of the recording medium. The radial driver rotates or linearly moves the supporting arm in the radial direction of the recording medium. The ramp vertically moves the supporting arm as the supporting arm rotates or linearly moves in the radial direction of the recording medium.

The above configuration allows the highly rigid supporting arm to rotate about the bearing section in a direction perpendicular to the recording face of the recording medium. Since the supporting arm is highly rigid, no vibration occurs in the L/UL system, and thus makes stable L/UL operation feasible. Moreover, this configuration offers high design flexibility with respect to the disk drive apparatus, enabling downsizing. Furthermore, the ramp, which executes the L/UL operation, can be disposed in a position that does not interfere with the disk surface. This offers a highly reliable disk drive apparatus without foreign particles being generated by contact between the supporting arm and ramp.

DETAILED DESCRIPTION OF THE INVENTION

Exemplary embodiments of the present invention are described below with reference to drawings.
First Exemplary Embodiment FIG. 1 is a perspective view of a disk drive apparatus in a first exemplary embodiment of the present invention.

Figure 1:
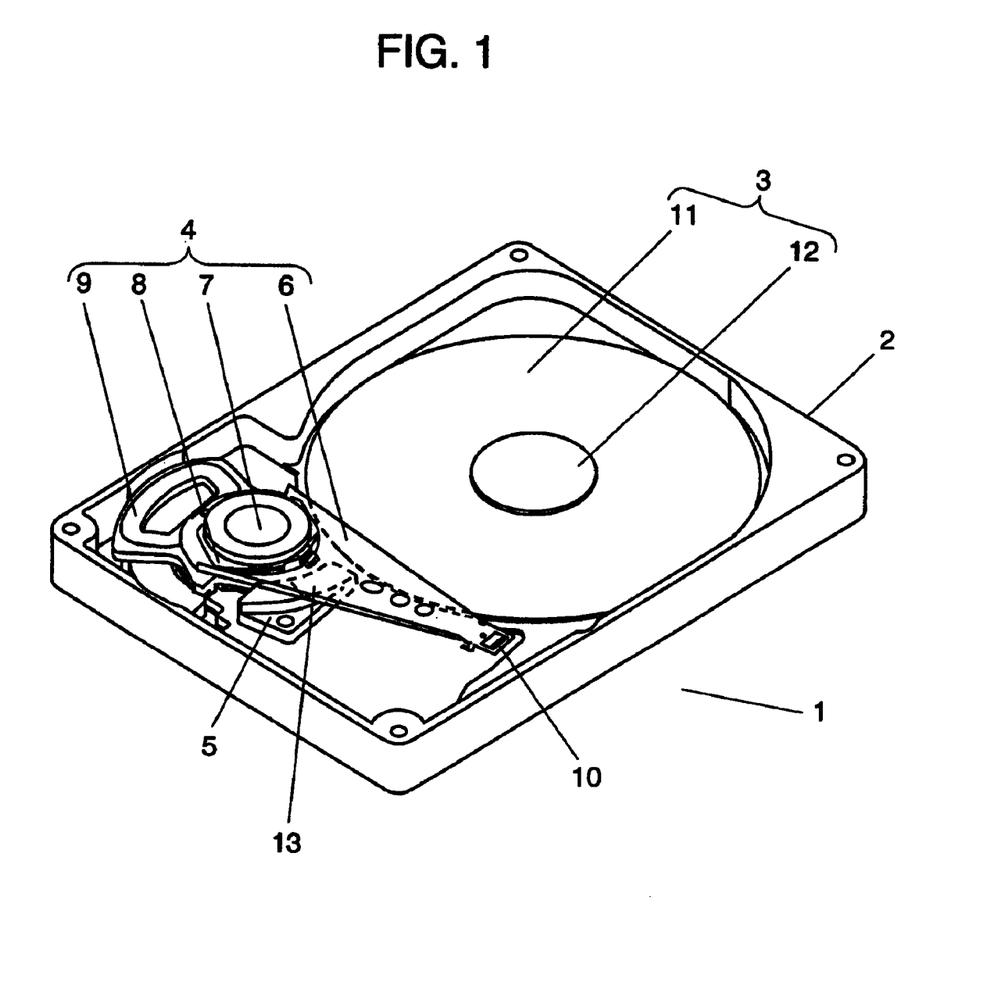
FIG. 1 is a perspective view of a disk drive apparatus in accordance with a first exemplary embodiment of the present invention.

FIG. 1 illustrates the state where a supporting arm is resting on a ramp in the L/UL system, which means that the magnetic head is unloaded.

Disk drive apparatus 1 includes housing 2, disk unit 3, head actuator 4, and ramp 5.

Head actuator 4 includes supporting arm 6, first bearing 7, second bearing 8, coil 9, and VCM (Voice Coil Motor) configured such as a yoke (not illustrated). Slider 10 on which the head element (not illustrated) for recording and playback is disposed is attached to a tip of supporting arm 6 in a way such that slider 10 faces magnetic recording medium 11 in disk unit 3. Supporting arm 6 rotates about first bearing 7 in a radial direction of magnetic recording medium 11. In addition, supporting arm 6 is configured rotatably about second bearing 8 in a direction perpendicular to the surface of magnetic recording medium 11 in what is called gate movement.

Disk unit 3 includes magnetic recording medium 11 and spindle motor 12 which is a rotation means for magnetic recording medium 11.

During recording or playback of disk drive apparatus 1, the state where the magnetic head is loaded, the magnetic head installed on slider 10 fly from magnetic recording medium 11 at a predetermined distance in proportion to the levitation force of the airflow generated by the rotation of magnetic recording medium 11 and the force of the head support mechanism disposed on supporting arm 6 applied to slider 10 toward magnetic recording medium 11.

The first exemplary embodiment shown in FIG. 1 employs the L/UL system. In this system, impact resistance is improved and storage capacity is increased by running up supporting arm 6 onto ramp 5 when magnetic recording medium 11 is stopped and the magnetic head is moved from the surface of magnetic recording medium 11. In this exemplary embodiment, ramp 5 vertically moves a portion of supporting arm 6 between first bearing 7 and the magnetic head. As shown in FIG. 1, ramp 5 is provided near first bearing 7 of head actuator 4 in an area that does not interfere with the recording face of the magnetic recording medium. Tapered portion 13 is provided on ramp 5 so that supporting arm 6 moves vertically while supporting arm 6 rotates about first bearing 7.

The above configuration prevents damage to slider 10 and magnetic recording medium 11 by adhesion of slider 10 to the surface of magnetic recording medium 11 or by physical impact. Housing 2 holds the above members at predetermined positions, and seals these members with a cover (not illustrated) having mostly the same shape as housing 2 to prevent the influence of minute dust particles and changes in airflow.

Figure 2:
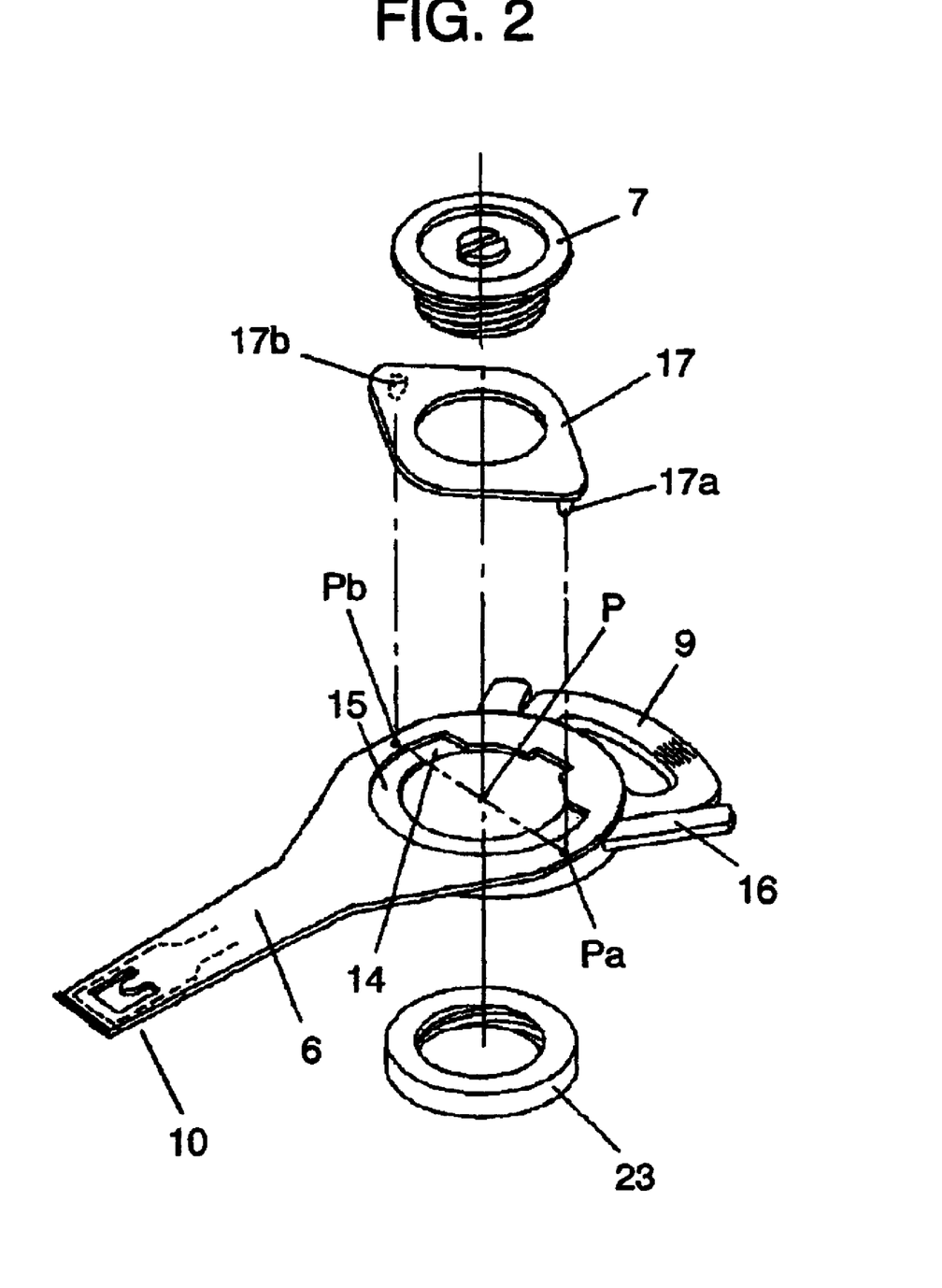
FIG. 2 is an exploded perspective view illustrating the configuration of a head actuator in accordance with the first exemplary embodiment of the present invention.
Figure 3:
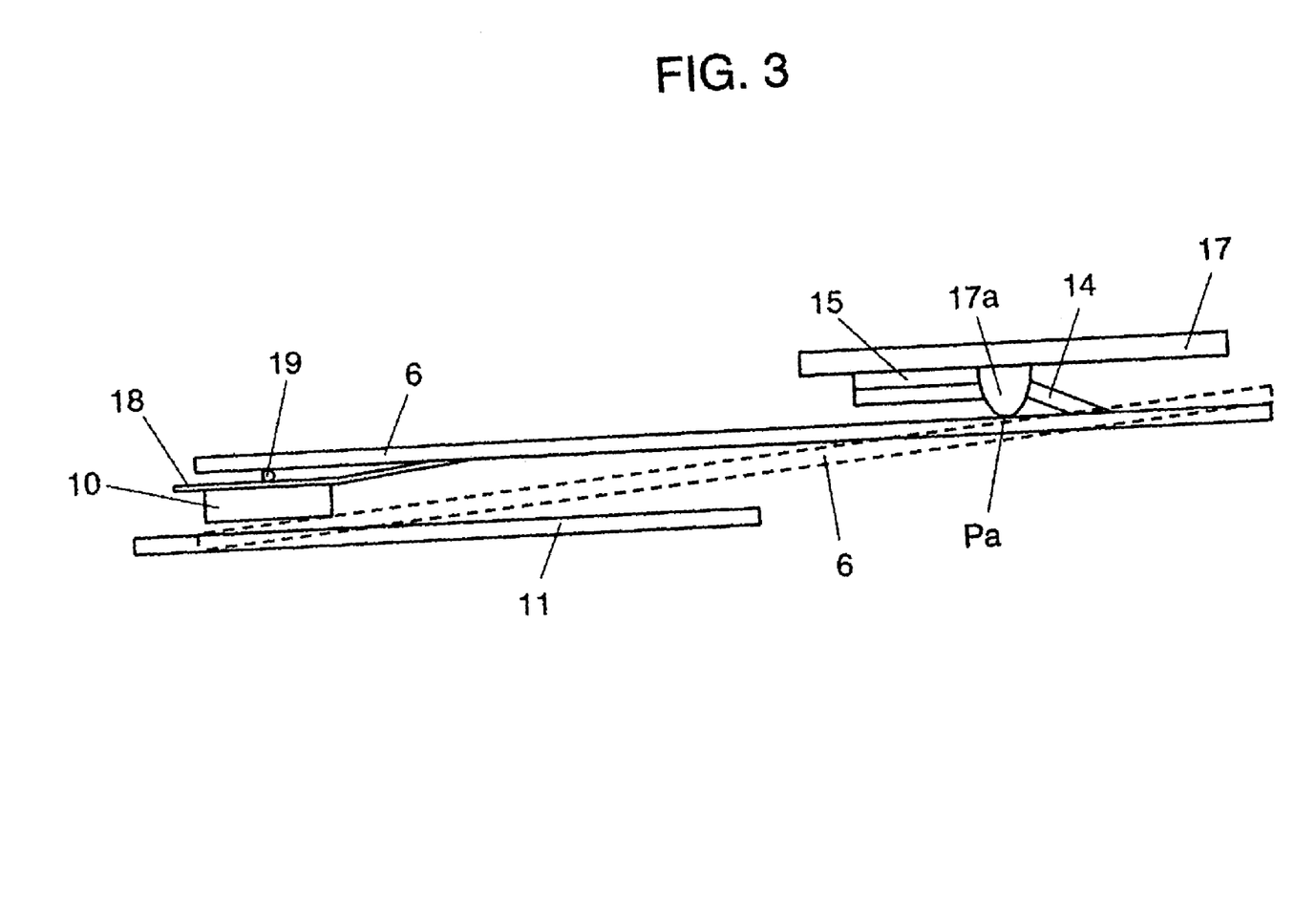
FIG. 3 is a fragmentary sectional view illustrating the configuration of the head actuator in accordance with the first exemplary embodiment of the present invention.

FIGS. 2 and 3 show the configuration of head actuator 4. FIG. 2 is an exploded perspective view showing the configuration of the head actuator. FIG. 3 is a fragmentary sectional view in FIG. 2. As shown in FIG. 2, head actuator 4 includes an approximately ring-shaped spring portion 14, semicircular spring fixing member 15 fixed to spring portion 14, and supporting arm 6 to which spring portion 14 is fixed. Supporting arm 6 is fixed to coil holder 16 to which voice coil 9 is attached such that supporting arm 6 is rotatable in the radial direction of magnetic recording medium 11 by the voice coil motor. These members are interposed between pivot bearing 17 which is second bearing 8, first bearing 7, and nut 23. As shown in FIG. 3, slider 10 disposed on the bottom face of the magnetic head (not illustrated) is positioned by dimple 19 via gimbal 18 on the bottom face of one end of supporting arm 6. The other end of supporting arm 6 is fixed to one end of spring portion 14. The other end of spring portion 14 is fixed to pivot bearing 17 via spring fixing member 15.

This configuration ensures that supporting arm 6 is elastic held by pivot bearing 17 via spring portion 14. Pivot bearing 17 has a pair of protrusions 17a and 17b. These protrusions 17a and 17b contact supporting arm 6 at points Pa and Pb. The resilient force of spring portion 14 is applied to one end of supporting arm 6 toward magnetic recording medium 11. In this state, a compressive stress is generated at contact points Pa and Pb. If there is no magnetic recording medium 11, spring portion 14 acts to place supporting arm 6 at the position indicated by the dotted line in FIG. 3.

Protrusions 17a and 17b of pivot bearing 17 are perpendicular to the central rotation axis of supporting arm 6 rotating in the radial direction of magnetic recording medium 11 and the length direction of supporting arm 6, and contact supporting arm 6 on the line passing this center of rotation axis.

When the magnetic recording and reproducing apparatus is operated, that is, when slider 10 is levitated from magnetic recording medium 11, the compressive stress of protrusions 17a and 17b of pivot bearing 17 against supporting arm 6 in the direction of magnetic recording medium 11 generates a load on slider 10. In other words, pivot bearing 17 is the load-applying means for slider 10.

The head support assembly as configured above allows to form the head support assembly with highly rigid material in the entire area of supporting arm 6 from the portion supported by pivot bearing 17 to the portion where slider 10 is disposed without using a low-rigidity suspension, as in the prior art.

In this configuration, ramp 5 is disposed between first bearing 7 of supporting arm 6 and the head, and supporting arm 6 itself is moved vertically for unloading when slider 10 is moved to the standby position in the unloaded state. Since only highly rigid supporting arm 6 is moved vertically for unloading, no vibration occurs, ensuring stable unloading. In addition, the position of ramp 5 can be determined as required, increasing the design flexibility of the disk drive apparatus. If ramp 5 is disposed near first bearing 7 of supporting arm 6, as shown in FIG. 1, the disk drive apparatus can be downsized. Still more, as in FIG. 1, ramp 5 can be disposed in an area that does not interfere with disk unit 3. This prevents any foreign particles generated by wear when supporting arm 6 rests on ramp 5 from dropping onto the surface of magnetic recording medium 11, increasing the reliability of recording and playback.

Furthermore, in the first exemplary embodiment, supporting arm 6 rests on ramp 5, and slider 10 moves vertically only for a predetermined distance using tapered portion 13 of ramp 5. Since supporting arm 6 is highly rigid, no torsion or deformation occurs even if any part of supporting arm 6, other than a part on the axis of symmetry, is slid up ramp 5. This increases the design flexibility of the position and shape of ramp 5, facilitating downsizing.

The center of gravity of supporting arm 6 when voice coil 9 and coil holder 16 are mounted is configured in a way such that it practically matches the position of midpoint P on the line connecting points Pa and Pb where protrusions 17a and 17b of pivot bearing 17 contact supporting arm 6. This makes it possible to offer a stable head support device with less vibration in response to an external impact.

Second Exemplary Embodiment

Figure 4:
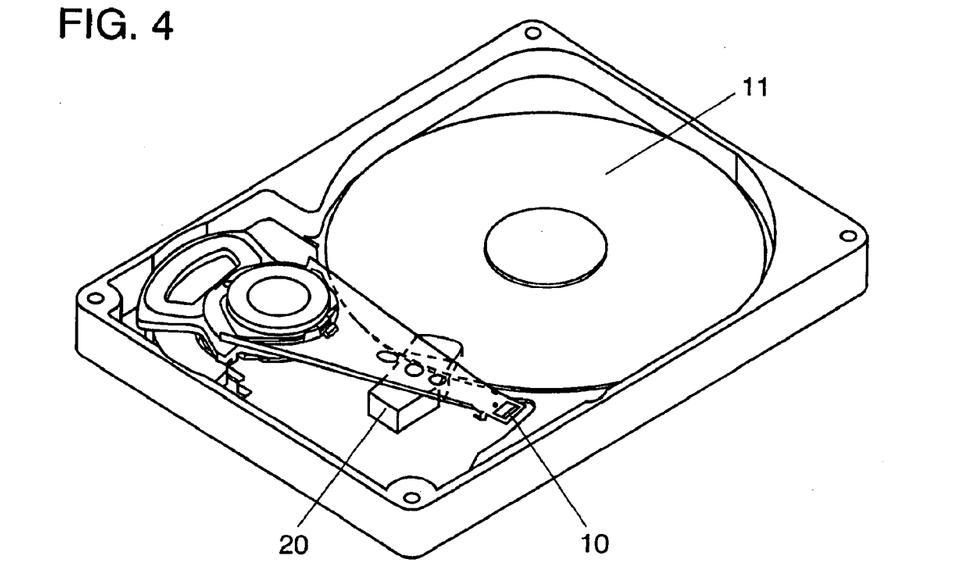
FIG. 4 is a perspective view of a disk drive apparatus in accordance with a second exemplary embodiment of the present invention.

FIG. 4 is a perspective view of a disk drive apparatus in a second exemplary embodiment employing the L/UL system.

The configuration of the disk drive apparatus in FIG. 4 is basically the same as that of the disk drive apparatus in FIG. 1. The point which differs is that ramp 20, where supporting arm 6 is moved, is disposed near slider 10 of supporting arm 6. In addition, a part of ramp 20 is disposed so as to protrude toward magnetic recording medium 11 in disk unit 3.

The second exemplary embodiment enables slider 10 to move to the standby position by a part near slider 10 of supporting arm 6. This further ensures stable unloading.

Third Exemplary Embodiment

Figure 5:
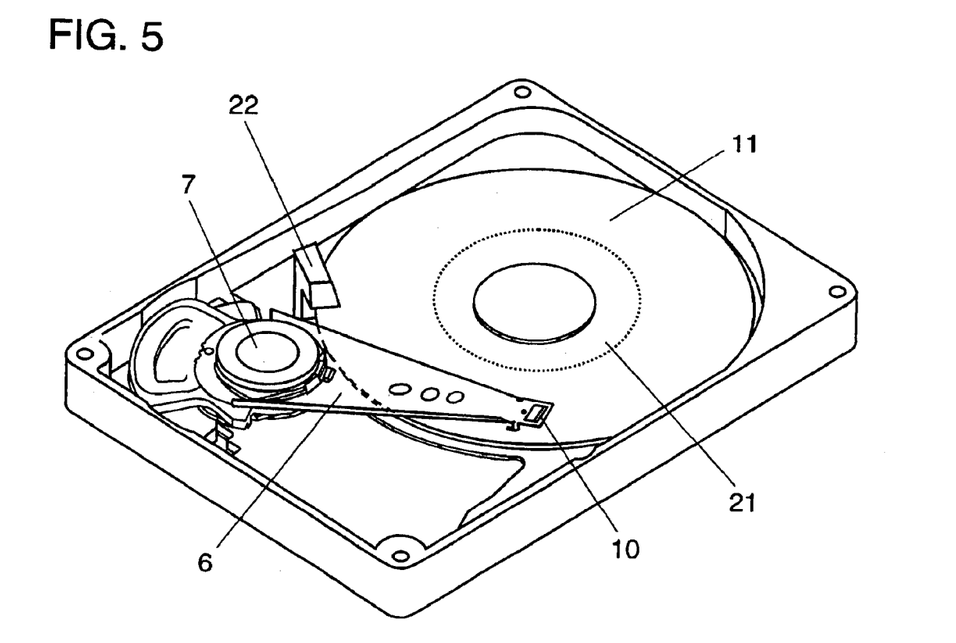
FIG. 5 is a perspective view of a disk drive apparatus in accordance with a third exemplary embodiment of the present invention.

FIG. 5 is a perspective view of a disk drive apparatus in a third exemplary embodiment of the present invention employing the CSS system.

In the CSS system, the surface of the predetermined zone on the disk recording medium in the disk unit to which the head is moved is roughened and divided from the recording zone to prevent adhesion of the magnetic head to the magnetic recording medium when the rotation of the magnetic recording medium is stopped. This has been hindering progress in increasing the memory capacity of magnetic recording media, and also reducing the efficiency of disk processing.

In the third exemplary embodiment, the supporting arm is lifted and held when the rotation of the magnetic recording medium is stopped to solve the disadvantage of the CSS system. Parts of the disk drive apparatus shown in FIG. 5 are the same as those in FIGS. 1, 2, and 3, and thus they are given the same reference numerals.

FIG. 5 illustrates the state that the head is over magnetic recording medium 11 in the CSS system. When the rotation of magnetic recording medium 11, which is a disk, is stopped in the CSS system, supporting arm 6 rotates to move slider 10 of supporting arm 6 to standby zone 21 provided inside the inner periphery of the disk. In the conventional CSS system, levitation by airflow generated between the disk face and slider is reduced by slowing the rotation speed of the disk, and the slider contacts the disk surface when it finally stops. In the third exemplary embodiment, supporting arm 6 is lifted by holder 22 when the rotation of the disk stops so as to reduce the contact pressure between the surface of magnetic recording medium 11 and slider 10. Holder 22 slightly lifts the end of supporting arm 6 near first bearing 7. In other words, the position and shape of holder 22 are adjusted to achieve zero or less contact pressure between slider 10 and magnetic recording medium 11 when magnetic recording medium 11 stops rotating.

This configuration prevents adhesion of the surface of magnetic recording medium 11 and slider 10, and also eliminates the need to provide standby zone 21 which has a rough surface different from the recording zone on magnetic recording medium 11. Accordingly, the workability of the magnetic recording medium improves, and the recording capacity also increases as a result of expanding the recording zone.

In the exemplary embodiments, it is apparent that the same effect is achievable by providing the ramp and holder respectively outside the magnetic recording medium or providing them inside the inner periphery of the magnetic recording medium, as shown in FIG. 4.

The exemplary embodiments refer to an example of rotating the supporting arm in the radial direction of the magnetic recording medium by the voice coil motor. However, it is apparent that the same effect is achievable by moving the supporting arm linearly in the radial direction of the magnetic recording medium.

The exemplary embodiments describe a disk drive apparatus employing a magnetic head. However, the same effect is achievable for non-contact disk drive apparatuses such as optical disk drive apparatuses and magneto-optical disk drive apparatuses.

The present invention thus offers the disk drive apparatus best suited for downsizing and for safe, stable, and highly reliable operations in both the L/UL system and CSS system by vertically moving the supporting arm itself.

What is claimed is:

1. A disk drive apparatus comprising:

a recording medium rotatably supported;

a rotation means for rotating said recording medium;

a supporting arm having at least a higher rigidity than a gimbal portion and having a head facing said recording medium at one end via said gimbal portion, said supporting arm being rotatable about a bearing section at the other end of the supporting arm in a direction perpendicular to a recording face of said recording medium;

a load-applying means for applying a load to said supporting arm in a direction for approaching said head to said recording medium;

a radial driving means for rotating or linearly moving said supporting arm in a radial direction of said recording medium; and a ramp for vertically moving said supporting arm between said bearing section and said head by the rotation or linear movement of said supporting arm in the radial direction of said recording medium.

2. The disk drive apparatus as defined in claim 1, wherein said ramp is means for keeping said head at a standby position apart from a surface of said recording medium when said recording medium stops rotating.

3. The disk drive apparatus as defined in claim 2, wherein said ramp is disposed at a position not interfering with said disk.

4. The disk drive apparatus as defined in claim 1, wherein said ramp is means for keeping said head at a standby position by making said head contact a surface of said disk when said recording medium stops rotating.

5. The disk drive apparatus as defined in claim 4, wherein a slider is installed on said head, and said ramp removes a contact pressure occurred by said slider contacting a surface of said recording medium.

6. The disk drive apparatus as defined in claim 4, wherein said ramp is disposed at a position not interfering with said disk.

7. The disk drive apparatus as defined in claim 1, wherein said bearing section includes a pivot bearing having a pair of protrusions contacting said supporting arm.

8. The disk drive apparatus as defined in claim 7, wherein a line passing a rotation center of said rotation means rotating said supporting arm in a radial direction of said recording medium and a line connecting a vair of protrusions of said pivot bearing in said bearing section cross.

9. The disk drive apparatus as defined in claim 1, wherein said ramp vertically moves said supporting arm contacting at a position outside of a lengthwise central axis of said supporting arm.

* * * * *